US008626925B2

(12) United States Patent
Milligan et al.

(10) Patent No.: US 8,626,925 B2
(45) Date of Patent: *Jan. 7, 2014

(54) SYSTEMS AND METHODS FOR PROVIDING A SELECTIVE MULTICAST PROXY ON A COMPUTER NETWORK

(75) Inventors: Thomas Milligan, South Jordan, UT (US); Bryant Eastham, Draper, UT (US)

(73) Assignee: Panasonic Corporation, Osaka (JP)

( * ) Notice: Subject to any disclaimer, the term of this patent is extended or adjusted under 35 U.S.C. 154(b) by 1436 days.

This patent is subject to a terminal disclaimer.

(21) Appl. No.: 11/305,838

(22) Filed: Dec. 16, 2005

(65) Prior Publication Data

US 2007/0143458 A1   Jun. 21, 2007

(51) Int. Cl.
*G06F 15/16* (2006.01)

(52) U.S. Cl.
USPC ........... 709/227; 709/228; 709/229; 709/230; 709/238; 370/389; 370/390; 370/391; 370/392; 370/432

(58) Field of Classification Search
USPC ........................................................ 709/231
See application file for complete search history.

(56) References Cited

U.S. PATENT DOCUMENTS

| 6,463,447 B2 * | 10/2002 | Marks et al. ................. 715/234 |
| 6,687,731 B1 * | 2/2004 | Kavak ........................... 718/105 |
| 6,789,125 B1 * | 9/2004 | Aviani et al. ................. 709/238 |
| 7,130,895 B2 * | 10/2006 | Zintel et al. .................. 709/220 |
| 7,162,539 B2 * | 1/2007 | Garcie-Luna-Aceves .... 709/242 |
| 7,305,375 B2 * | 12/2007 | Cioccarelli ........................ 1/1 |
| 7,318,100 B2 * | 1/2008 | Demmer et al. .............. 709/229 |
| 7,343,422 B2 * | 3/2008 | Garcia-Luna-Aceves et al. ............................. 709/238 |
| 7,437,434 B2 * | 10/2008 | Zintel et al. .................. 709/220 |
| 7,441,019 B2 * | 10/2008 | Zintel et al. .................. 709/220 |
| 7,460,533 B1 * | 12/2008 | Tripathi et al. ............... 370/390 |
| 7,516,236 B2 * | 4/2009 | Walsh et al. .................. 709/232 |
| 7,525,927 B2 * | 4/2009 | Sato et al. ..................... 370/254 |
| 7,546,355 B2 * | 6/2009 | Kalnitsky ...................... 709/219 |
| 7,552,233 B2 * | 6/2009 | Raju et al. ..................... 709/238 |
| 7,562,147 B1 * | 7/2009 | Cohen ........................... 709/228 |
| 7,565,450 B2 * | 7/2009 | Garcia-Luna-Aceves et al. ............................. 709/245 |
| 7,577,754 B2 * | 8/2009 | Garcia-Luna-Aceves et al. ............................. 709/238 |
| 7,580,375 B1 * | 8/2009 | Friedrich et al. .............. 370/260 |
| 7,602,756 B2 * | 10/2009 | Gu et al. ....................... 370/338 |
| 7,664,876 B2 * | 2/2010 | Garcia-Luna-Aceves et al. ............................. 709/240 |
| 7,685,300 B2 * | 3/2010 | Burrows et al. ............... 709/230 |

(Continued)

FOREIGN PATENT DOCUMENTS

WO   WO 2006/112664   * 10/2006   ............. H04L 12/12

OTHER PUBLICATIONS

Wikipedia, Proxy Server, p. 1-8.*

*Primary Examiner* — Backhean Tiv
(74) *Attorney, Agent, or Firm* — Austin Rapp & Hardman

(57) ABSTRACT

A plurality of non-multicast nodes that do not process multicast messages register with a selective multicast proxy. In response to receiving a request for a service from a requestor via multicast, the selective multicast proxy identifies among the plurality of non-multicast nodes one or more providers of the requested service. The selective multicast proxy sends the request to the one or more providers without sending the request to other non-multicast nodes on the computer network. The selective multicast proxy, the requestor of the service, the provider(s) of the service, and the non-multicast nodes may all be located within the same local area network.

20 Claims, 8 Drawing Sheets

(56) References Cited

U.S. PATENT DOCUMENTS

| | | | |
|---|---|---|---|
| 7,725,596 B2* | 5/2010 | Garcia-Luna-Aceves et al. | 709/238 |
| 7,822,862 B2* | 10/2010 | Slater et al. | 709/229 |
| 7,908,337 B2* | 3/2011 | Garcia-Luna-Aceves et al. | 709/217 |
| 2001/0047401 A1* | 11/2001 | McTernan et al. | 709/219 |
| 2002/0007374 A1* | 1/2002 | Marks et al. | 707/513 |
| 2002/0007413 A1* | 1/2002 | Garcia-Luna-Aceves et al. | 709/229 |
| 2002/0010782 A1* | 1/2002 | Hoebeke et al. | 709/227 |
| 2002/0013897 A1* | 1/2002 | McTernan et al. | 713/153 |
| 2002/0078219 A1* | 6/2002 | Tate et al. | 709/231 |
| 2003/0101278 A1* | 5/2003 | Garcia-Luna-Aceves et al. | 709/240 |
| 2003/0108030 A1* | 6/2003 | Gao | 370/351 |
| 2003/0142671 A1* | 7/2003 | DeRango et al. | 370/390 |
| 2004/0122890 A1* | 6/2004 | Watkinson | 709/203 |
| 2005/0060410 A1* | 3/2005 | Wu et al. | 709/227 |
| 2005/0114656 A1* | 5/2005 | Liu et al. | 713/163 |
| 2005/0157742 A1* | 7/2005 | Chen et al. | 370/432 |
| 2005/0170842 A1* | 8/2005 | Chen | 455/454 |
| 2005/0204042 A1* | 9/2005 | Banerjee et al. | 709/226 |
| 2005/0213525 A1* | 9/2005 | Grayson et al. | 370/312 |
| 2006/0129684 A1* | 6/2006 | Datta | 709/229 |
| 2006/0174160 A1* | 8/2006 | Kim | 714/18 |
| 2006/0242322 A1* | 10/2006 | Williams et al. | 709/245 |
| 2007/0076714 A1* | 4/2007 | Ananthakrishnan et al. | 370/390 |
| 2007/0143458 A1* | 6/2007 | Milligan et al. | 709/223 |
| 2008/0263124 A1* | 10/2008 | Song et al. | 709/201 |
| 2009/0013083 A9* | 1/2009 | Garcia-Luna-Aceves et al. | 709/229 |
| 2010/0198913 A1* | 8/2010 | Garcia-Luna-Aceves et al. | 709/203 |

* cited by examiner

SYSTEMS AND METHODS FOR PROVIDING A SELECTIVE MULTICAST PROXY ON A COMPUTER NETWORK

TECHNICAL FIELD

The present invention relates generally to computers and computer-related technology. More specifically, the present invention relates to systems and methods for providing a selective multicast proxy on a computer network.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc. As used herein, the term "computer network" (or simply "network") refers to any system in which a series of nodes are interconnected by a communications path. The term "node" refers to any device that may be connected as part of a computer network. An embedded system may be a network node. Other examples of network nodes include computers, personal digital assistants (PDAs), cell phones, etc.

Some embedded systems may provide data and/or services to other computing devices using a computer network. Many different kinds of services may be provided. Some examples of services include providing temperature data from a location, providing surveillance data, providing weather information, providing an audio stream, providing a video stream, etc. As used herein, the term "requester" refers to a node that requests a service from a provider. The term "provider" refers to a node that provides a service to a requestor.

Some of the nodes within a computer network may be configured to send messages to other nodes on the network using multicast technology. Within the context of computer networks, the term "multicasting" refers to the process of sending a message simultaneously to more than one node on the network. Multicasting is different from broadcasting in that multicasting means sending a message to specific groups of nodes within a network, whereas broadcasting implies sending a message to all of the nodes on the network.

A node that is requesting a service (i.e., a requester) may send a service request to other nodes within the network via multicast. However, several issues have arisen with known approaches to the use of multicast technology on a computer network to request services. For example, a computer network may include one or more resource-constrained nodes that are not capable of receiving and/or processing multicast messages. If a requestor sends a request for a service to other nodes within the network via multicast, these resource-constrained nodes may not receive (and therefore have an opportunity to respond to) the service request.

Another issue with known approaches is that each node that receives a service request via multicast typically determines whether it provides the requested service, and if it does, it responds to the service request. Such an approach may be inefficient under some circumstances because several nodes that do not provide the requested service may still process a request for the service.

Yet another issue with known approaches is that it may be discovered that one or more nodes within the network are defective in some way. If this occurs, it may be desirable to prevent such nodes from directly processing multicast messages. This may be accomplished by shutting down the appropriate multicast protocol stack on the node. However, such an approach may not be desirable under some circumstances because this may prevent such nodes from receiving and responding to service requests that are sent on the network via multicast.

In view of the foregoing, benefits may be realized by improvements related to the use of multicast technology on a computer network. Accordingly, some exemplary systems and methods for facilitating more efficient processing of multicast requests on a computer network are disclosed herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
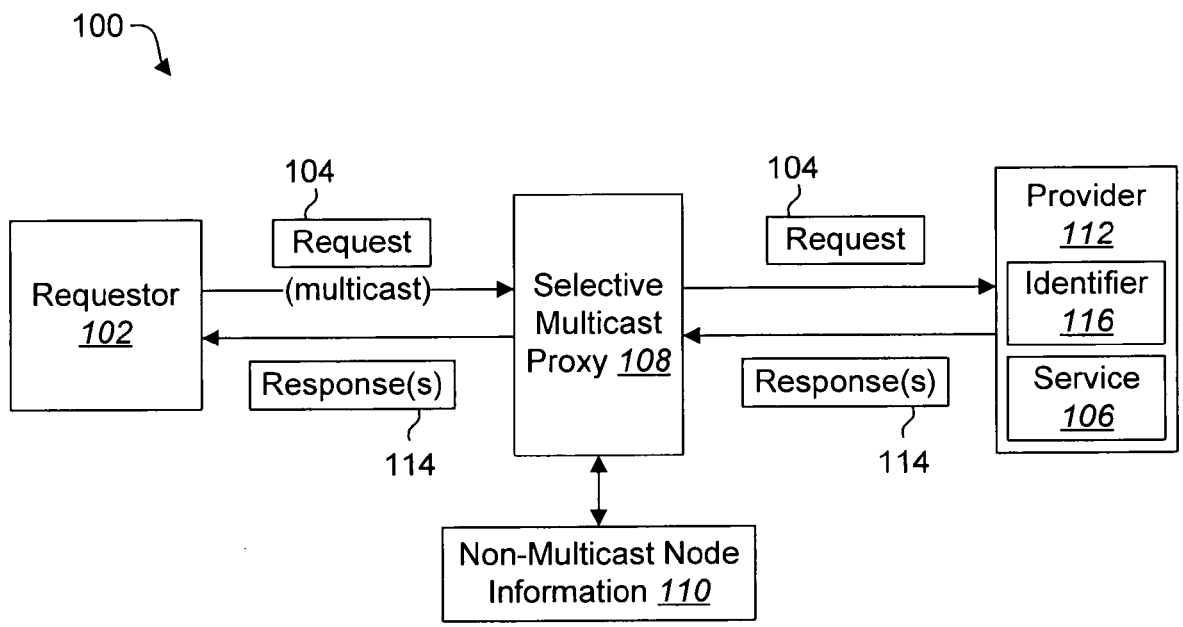
FIG. 1 is a block diagram that illustrates a system for processing multicast requests on a computer network according to an embodiment.

Systems and methods for providing a selective multicast proxy on a computer network are disclosed. In an exemplary embodiment, a selective multicast proxy receives registration of a plurality of non-multicast nodes that do not process multicast messages. In response to receiving a request for a service from a requestor via multicast, the selective multicast proxy identifies among the plurality of non-multicast nodes one or more providers of the requested service. The selective multicast proxy sends the request to the one or more providers without sending the request to other non-multicast nodes on the computer network. If the selective multicast proxy receives one or more responses to the request from the one or more providers, the selective multicast proxy sends the response(s) to the original requestor. The selective multicast proxy, the requestor, and the plurality of non-multicast nodes may all be located within the same local area network.

The request may be sent to the one or more providers via a connection-based protocol. Alternatively, the request may be sent to the one or more providers via a connectionless protocol.

In order to identify the one or more providers of the requested service, a database of registered nodes may be maintained. The request may include a service identifier that identifies the requested service. The selective multicast proxy may detect the service identifier within the request, and then search for the service identifier within the database of registered nodes.

The plurality of non-multicast nodes may include at least one resource-constrained node that is not capable of processing multicast messages. Alternatively, or in addition, the plurality of non-multicast nodes may include at least one multicast-capable node that is capable of processing multicast messages. The selective multicast proxy may facilitate registration of multicast-capable nodes by periodically sending a proxy announcement message via multicast.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram that illustrates a system 100 for processing multicast requests on a computer network according to an embodiment. The embodiment depicted in FIG. 1 is implemented within a single local area network (LAN). The LAN includes a plurality of nodes that are connected by a communications link that enables nodes on the LAN to interact with one another.

Some of the nodes within the LAN provide services to other nodes. As stated above, a requestor is a node that requests a service from a provider. A provider is a node that provides a service to a requestor.

In the system 100 shown in FIG. 1, a requestor 102 sends a request 104 for a service 106 to other nodes within the LAN via multicast. A connectionless protocol, such as the User Datagram Protocol (UDP), may be used as the transport protocol to send service requests via multicast. Such service requests may be referred to as UDP multicast requests.

Some of the nodes in the LAN may not process multicast messages. For example, the LAN may include one or more resource-constrained nodes that are not capable of receiving and/or processing multicast messages (e.g., that do not have the appropriate multicast protocol stack for processing multicast messages). As another example, the LAN may include one or more nodes that are capable of processing multicast messages but that have been configured or notified not to process multicast messages, at least temporarily. The term "non-multicast node" will be used herein to refer to a node that does not process multicast messages, either because it is not capable of processing multicast messages or because it has been configured or notified not to process multicast messages.

In the depicted embodiment, a selective multicast proxy 108 is provided on the LAN. In general terms, the selective multicast proxy 108 serves as an interface between the requestor 102 and non-multicast nodes on the LAN that do not process the request 104. The functionality provided by the selective multicast proxy 108 will be described in greater detail below.

Non-multicast nodes within the LAN register with the selective multicast proxy 108. Some exemplary ways that a non-multicast node may register with the selective multicast proxy 108 will be discussed below. The selective multicast proxy 108 maintains information 110 about the non-multicast nodes that have registered with it.

When the selective multicast proxy 108 receives a request 104 for a service 106, it does not simply forward the service request 104 to all non-multicast nodes that have registered with it. Rather, in response to receiving a request 104 for a particular service 106, the selective multicast proxy 108 determines which (if any) of the registered non-multicast nodes are capable of providing the requested service 106. In other words, the selective multicast proxy 108 identifies one or more providers 112 of the requested service 106 from among the non-multicast nodes that have registered with it. Some exemplary ways that the selective multicast proxy 108 may identify a provider 112 of the requested service 106 will be discussed below.

A service request 104 may specify that only the provider 112 with a specific provider identifier 116 of a service 106 should provide the request 104. Alternatively, a service request 104 may specify that all providers 112 of a service 106 should provide the request 104. In alternative embodiments, the selective multicast proxy 108 may identify more than one provider 112 of the requested service 106 with the same provider identifier 116. If this occurs, the selective multicast proxy 108 may select one provider 112 from among these providers with the same provider identifier 116. Various algorithms may be used to make this selection.

In the depicted embodiment, once the selective multicast proxy 108 has identified one or more providers 112 of the requested service 106, it forwards the request 104 to the provider(s) 112. If a connection (e.g., TCP/IP connection, serial connection, etc.) has been established between the selective multicast proxy 108 and a particular provider 112, then the selective multicast proxy 108 may send the service request 104 to the provider 112 via this connection. However, it is not necessary that a connection be established between the selective multicast proxy 108 and the identified provider(s) 112. For example, the selective multicast proxy 108 may send the service request 104 to the provider(s) 112 via a connectionless protocol, such as UDP unicast.

Advantageously, the selective multicast proxy 108 may be configured so that it only sends the service request 104 to the identified provider(s) 112, and not to other registered non-multicast nodes (or to other nodes within the LAN). Accordingly, it is not necessary for nodes that do not provide the requested service 106 to process the request 104 for the service 106, thereby conserving computational resources on these nodes.

The identified provider(s) 112 of the requested service 106 receive(s) the service request 104 from the selective multicast proxy 108 and respond(s) to it. The provider(s) 112 may send responses 114 to the service request 104 back to the selective multicast proxy 108, either via a connection between the selective multicast proxy 108 and the provider 112, or via a connectionless protocol. The selective multicast proxy 108 may forward any responses 114 that it receives from the provider(s) 112 back to the original requestor 102 using a connectionless protocol, such as UDP unicast.

Figure 2:
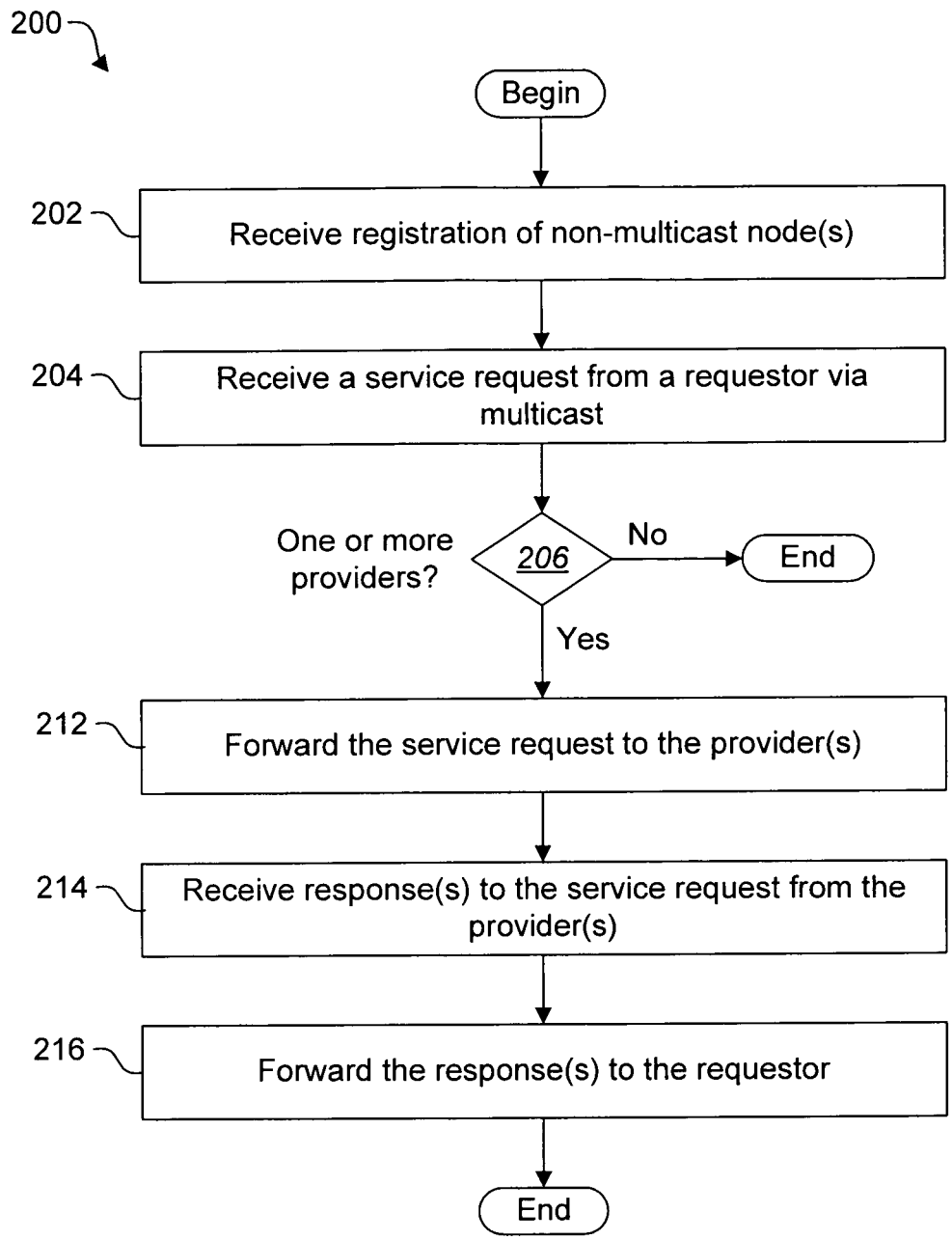
FIG. 2 is a flow diagram that illustrates the operation of the selective multicast proxy in the embodiment depicted in FIG. 1.

FIG. 2 is a flow diagram that illustrates the operation of the selective multicast proxy 108 in the embodiment depicted in FIG. 1. In step 202 of the illustrated method 200, the selective multicast proxy 108 receives registration of one or more non-multicast nodes within the LAN. The non-multicast nodes that register with the selective multicast proxy 108 may include one or more resource-constrained nodes that are not capable of receiving and/or processing multicast messages. Alternatively, or in addition, the registered non-multicast nodes may include one or more nodes that are capable of processing multicast messages but that have been configured or notified not to process multicast messages, at least temporarily.

In step 204, the selective multicast proxy 108 receives, via multicast, a request 104 for a service 106 from a requestor 102 within the LAN. One or more of the non-multicast nodes that have registered with the selective multicast proxy 108 may be capable of providing the requested service 106. In step 206, the selective multicast proxy 108 determines which (if any) of the registered non-multicast nodes are capable of providing the requested service 106. In other words, the selective multicast proxy 108 identifies the provider(s) 112 of the requested service 106 from among the non-multicast nodes that have registered with it. Some exemplary ways that the selective multicast proxy 108 may identify the provider(s) 112 of the requested service 106 will be discussed below.

If in step 206 the selective multicast proxy 108 determines that none of the registered non-multicast nodes are capable of providing the requested service 106, then the method 200 ends. If the selective multicast proxy 108 identifies one or more providers of the requested service 106, then in step 212 the selective multicast proxy forwards the service request 104 to the provider(s) 112. The selective multicast proxy 108 may send the request 104 to the provider(s) 112 via one or more connections that have been established between the selective multicast proxy 108 and the provider(s) 112. Alternatively, the selective multicast proxy 108 may send the request 104 to the provider 112 via a connectionless protocol, such as UDP unicast.

The provider(s) 112 may respond to the service request 104 by sending responses 114 to the service request 104 back to the selective multicast proxy 108. In step 214, the selective multicast proxy 108 receives one or more responses 114 to the service request 104 from the provider(s) 112. In step 216, the selective multicast proxy 108 forwards the responses 114 to the original requestor 102. This may be done in accordance with a connectionless protocol, such as UDP unicast.

Figure 3:
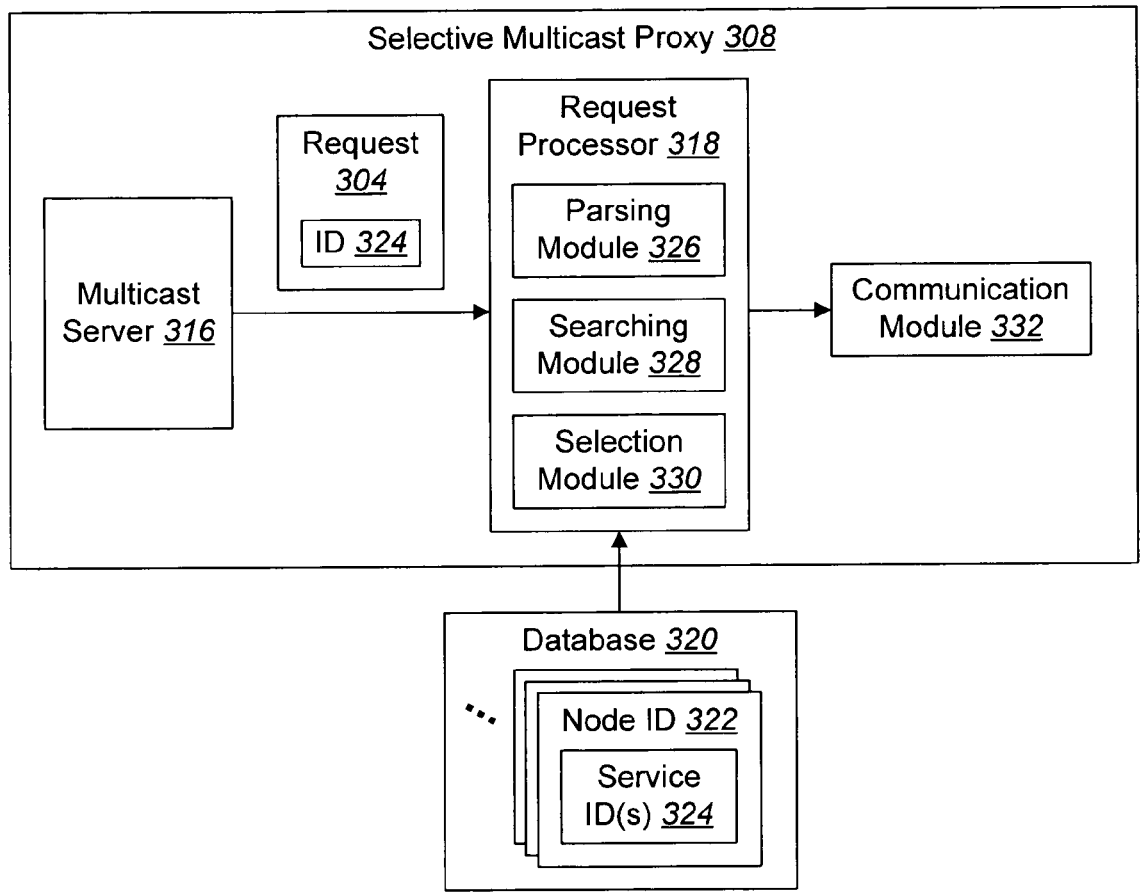
FIG. 3 is a block diagram that illustrates various components within a selective multicast proxy that is configured according to an embodiment.

FIG. 3 is a block diagram that illustrates various components within a selective multicast proxy 308 that is configured according to an embodiment. The illustrated components may implement the functionality of processing service requests 304 received from requestors within the LAN.

As shown, the selective multicast proxy 308 may include a multicast server 316 and a request processor 318. The multicast server 316 may be configured to listen on a specified multicast address and port for multicast packets and to pass the received packets as requests 304 to the request processor 318.

In the depicted embodiment, the request processor 318 within the selective multicast proxy 308 has access to a database 320 of registered nodes. The database 320 may be an integral or external module of the selective multicast proxy 308. The database 320 includes node identifiers 322 for the nodes that have registered with the selective multicast proxy 308. Each node identifier 322 is associated with one or more service identifiers 324. A service identifier 324 is information that identifies a particular service that may be provided by a node. In the depicted embodiment, when a service identifier 324 is associated with a node identifier 322, this means that the node that corresponds to the node identifier 322 is capable of providing the service that corresponds to the service identifier 324.

As shown, a request 304 for a particular service includes a service identifier 324 that identifies the requested service. In the depicted embodiment, when a request 304 for a particular service is passed to the request processor 318, a parsing module 326 detects the service identifier 324 within the request 304. The service identifier 324 is passed to a searching module 328, which searches for the service identifier 324 within the database 320 of registered nodes. If the searching module 328 detects a node identifier 322 that is associated with the service identifier 324, then the corresponding node is selected as a provider of the requested service. If the searching module 328 determines that more than one of the same node identifiers 322 are associated with the service identifier 324, then this means that there is more than one potential provider with the same node identifier 322 of the requested service. If this occurs, a selection module 330 selects the provider of the requested service from among the same potential providers that have been identified.

In the depicted embodiment, once the request processor 318 has identified the provider(s) of the requested service, it passes the request 304 to a communication module 332. The request processor 318 may also pass the node identifier(s) 322 of the identified provider(s) to the communication module 332. The communication module 332 may be configured to operate in accordance with a connection-oriented protocol, such as TCP/IP. Alternatively, or in addition, the communication module 332 may be configured to operate in accordance with a connectionless protocol, such as UDP. Once the communication module 332 has received the service request 304 and the node identifier(s) 322 of the provider(s) from the request processor 318, the communication module 332 may send the request 304 to the provider(s) of the requested service.

Additional information about how a selective multicast proxy may determine which of the non-multicast nodes are capable of providing the requested service are described in U.S. Pat. No. 6,954,798, entitled "Content-Based Routing of Data from a Provider to a Requestor," with inventor Bryant Eastham. This U.S. patent is hereby incorporated by reference in its entirety.

As briefly discussed above, the selective multicast proxy may be configured to receive registration of non-multicast nodes. In other words, non-multicast nodes within the LAN may register with the selective multicast proxy so that the selective multicast proxy receives multicast requests on their behalf. The non-multicast nodes that register with the selective multicast proxy may include one or more nodes that are capable of processing multicast messages. (Nodes that are capable of processing multicast messages may be referred to herein as "multicast-capable nodes.") There are a variety of reasons why a selective multicast proxy may be configured to serve as a multicast proxy for multicast-capable nodes. For example, if a multicast-capable node within the LAN is defective in some way (e.g., it has a "bug"), the LAN administrator may want to prevent that node from directly processing multicast messages until the defect can be fixed. In this case, the selective multicast proxy 308 can intervene and override the defective aspects of the defective node.

In addition to serving as a multicast proxy on behalf of multicast-capable nodes, the selective multicast proxy may also serve as a multicast proxy for resource constrained nodes that are not capable of processing multicast requests. This allows resource constrained nodes to respond to service requests using non-multicast requests proxied for them, where otherwise they could not receive those requests because of their inability to process multicast.

Figure 4:
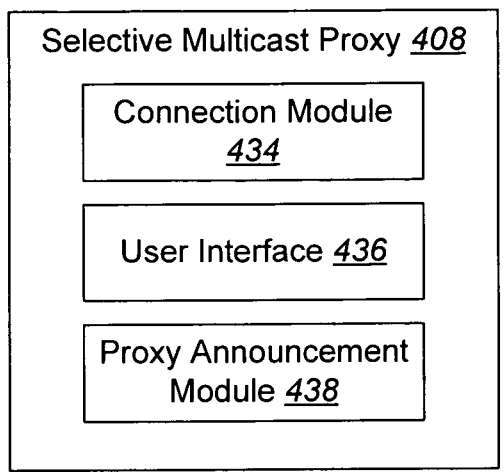
FIG. 4 is a block diagram that illustrates various additional components within a selective multicast proxy that is configured according to an embodiment.

FIG. 4 is a block diagram that illustrates various additional components within a selective multicast proxy 408 that is configured according to an embodiment. The illustrated components may implement the functionality of receiving registration of non-multicast nodes, which in the depicted embodiment may be resource constrained nodes that are not capable of processing multicast requests, and/or multicast-capable nodes that have been notified or configured not to process multicast requests.

As shown, the selective multicast proxy 408 may include a connection module 434. The connection module 434 may be configured to establish connections to non-multicast nodes in the LAN. In some embodiments the connection module 434 may be configured to establish TCP/IP connections. For example, the functionality of the connection module 434 may be implemented by a TCP/IP protocol stack that is configured to establish TCP/IP connections with other nodes in the LAN. Alternatively, or in addition, the connection module 434 may be configured to establish other kinds of connections, such as serial connections, to non-multicast nodes in the LAN.

The selective multicast proxy 408 may also include a user interface 436. A user of the selective multicast proxy 408 may interact with and provide instructions to the selective multicast proxy 408 via the user interface 436. For example, a LAN administrator may instruct the selective multicast proxy 408 to open one or more connections to non-multicast nodes in the LAN via the user interface 436 that is provided.

The selective multicast proxy 408 may also include a proxy announcement module 438. The proxy announcement module 438 may be configured to periodically send a proxy announcement message, via multicast, to one or more multicast groups on the LAN. The proxy announcement message may serve to notify multicast-capable nodes in the LAN of the existence of the selective multicast proxy 408. For example, as will be explained in greater detail below, the proxy announcement message may be interpreted by multicast-capable nodes in the LAN as an instruction to stop processing multicast messages.

Figure 5:
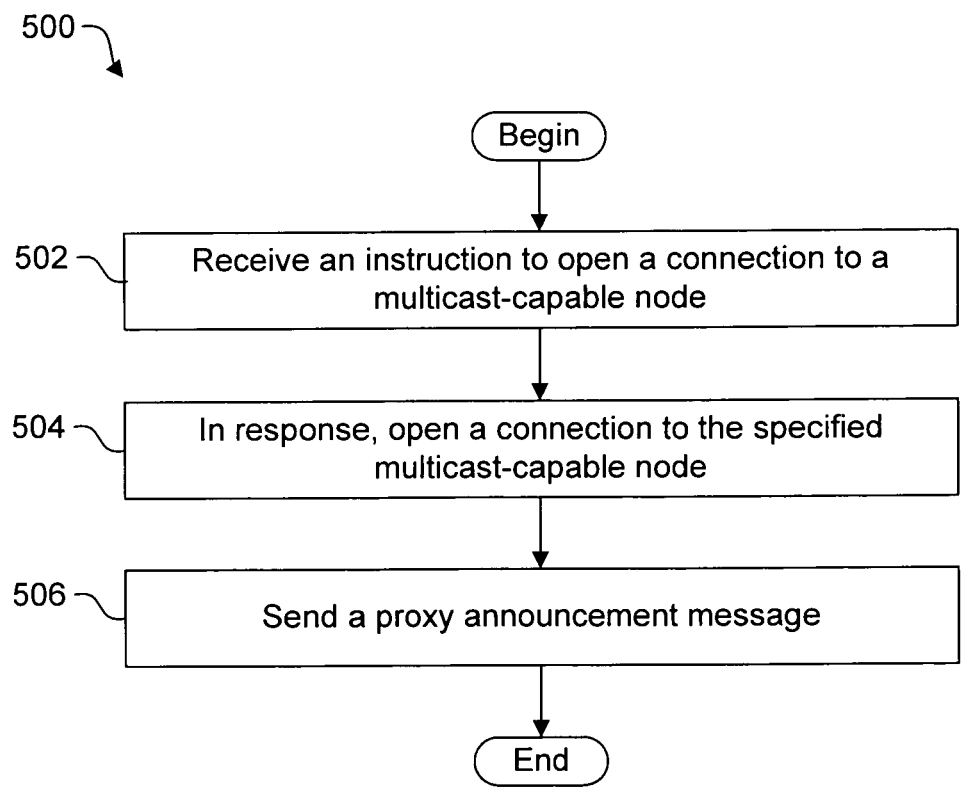
FIG. 5 is a flow diagram that illustrates the operation of the components depicted in FIG. 4 according to an embodiment.

FIG. 5 is a flow diagram that illustrates the operation of the connection module 434, the user interface 436, and the proxy announcement module 438 according to an embodiment. The method 500 that is shown in FIG. 5 may be performed in order to facilitate registration of a multicast-capable node with the selective multicast proxy 408.

In step 502, the selective multicast proxy 408 receives an instruction (e.g., from a LAN administrator), via the user interface 436 or configuration, to open a connection to a multicast-capable node. In step 504, in response to the instruction received in step 502, the connection module 434 opens a connection to the specified multicast-capable node. In other embodiments, multicast-capable nodes can be programmed, configured, or notified to connect to the selective multicast proxy's 308 communication module 332.

In step 506, the proxy announcement module 438 sends a proxy announcement message, via multicast, to a multicast group that includes the multicast capable node that was specified in step 502. The proxy announcement message may include the address of the selective multicast proxy 408. In response to receiving the proxy announcement message, the multicast-capable node may determine whether it is presently connected to the selective multicast proxy 408 (i.e., the node that is referenced in the proxy announcement message). If it is presently connected to the selective multicast proxy 408, then the multicast-capable node should, in response, stop processing multicast messages. For example, the multicast-capable node may terminate its multicast protocol stack. Alternatively, the multicast-capable node may simply start ignoring multicast messages, without terminating its multicast protocol stack. If the multicast-capable node is not presently connected to the selective multicast proxy 408, the multicast-capable node may choose to connect to the selective multicast proxy 408 and stop processing multicast messages. If at some point the connection between the multicast-capable node and the selective multicast proxy 408 is terminated, then the multicast-capable node may resume processing multicast messages.

In the method 500 depicted in FIG. 5, the step of sending the proxy announcement message is shown occurring after the step of opening a connection to a multicast-capable node. However, in some embodiments, these steps may not occur in this order. For example, in some embodiments, the proxy announcement module 438 may be configured so that it periodically sends out a proxy announcement message on the LAN. When the selective multicast proxy 408 opens a connection to a multicast-capable node, the multicast capable node may continue to receive and process multicast messages until the next scheduled proxy announcement message is sent.

Figure 6:
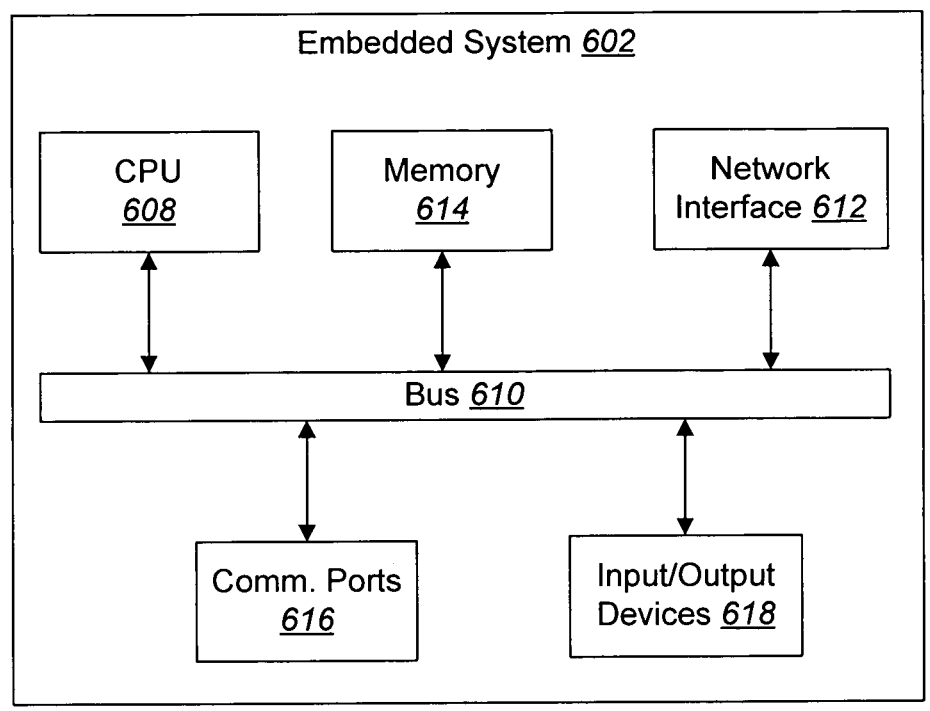
FIG. 6 is a block diagram of hardware components that may be used in an embedded system that is configured according to an embodiment.

As indicated above, the nodes within a network may include one or more embedded systems. The present systems and methods may be implemented in a computer network where an embedded system provides data and/or services to other computing devices. FIG. 6 is a block diagram of hardware components that may be used in an embedded system 602 that is configured according to an embodiment. A central processing unit (CPU) 608 or processor may be provided to control the operation of the embedded system 602, including the other components thereof, which are coupled to the CPU 608 via a bus 610. The CPU 608 may be embodied as a microprocessor, microcontroller, digital signal processor or other device known in the art. The CPU 608 performs logical and arithmetic operations based on program code stored within the memory. In certain embodiments, the memory 614 may be on-board memory included with the CPU 608. For example, microcontrollers often include a certain amount of on-board memory.

The embedded system 602 may also include a network interface 612. The network interface 612 allows the embedded system 602 to be connected to a network, which may be a pager network, a cellular network, a global communications network, the Internet, a computer network, a telephone network, etc. The network interface 612 operates according to standard protocols for the applicable network.

The embedded system 602 may also include memory 614. The memory 614 may include random access memory (RAM) for storing temporary data. Alternatively, or in addition, the memory 614 may include read-only memory (ROM) for storing more permanent data, such as fixed code and configuration data. The memory 614 may also be embodied as a magnetic storage device, such as a hard disk drive. The memory 614 may be any type of electronic device that is capable of storing electronic information.

The embedded system 602 may also include one or more communication ports 616, which facilitate communication with other devices. The embedded system 602 may also include input/output devices 618, such as a keyboard, a mouse, a joystick, a touchscreen, a monitor, speakers, a printer, etc.

Of course, FIG. 6 illustrates only one possible configuration of an embedded system 602. Various other architectures and components may be utilized.

Figure 7:
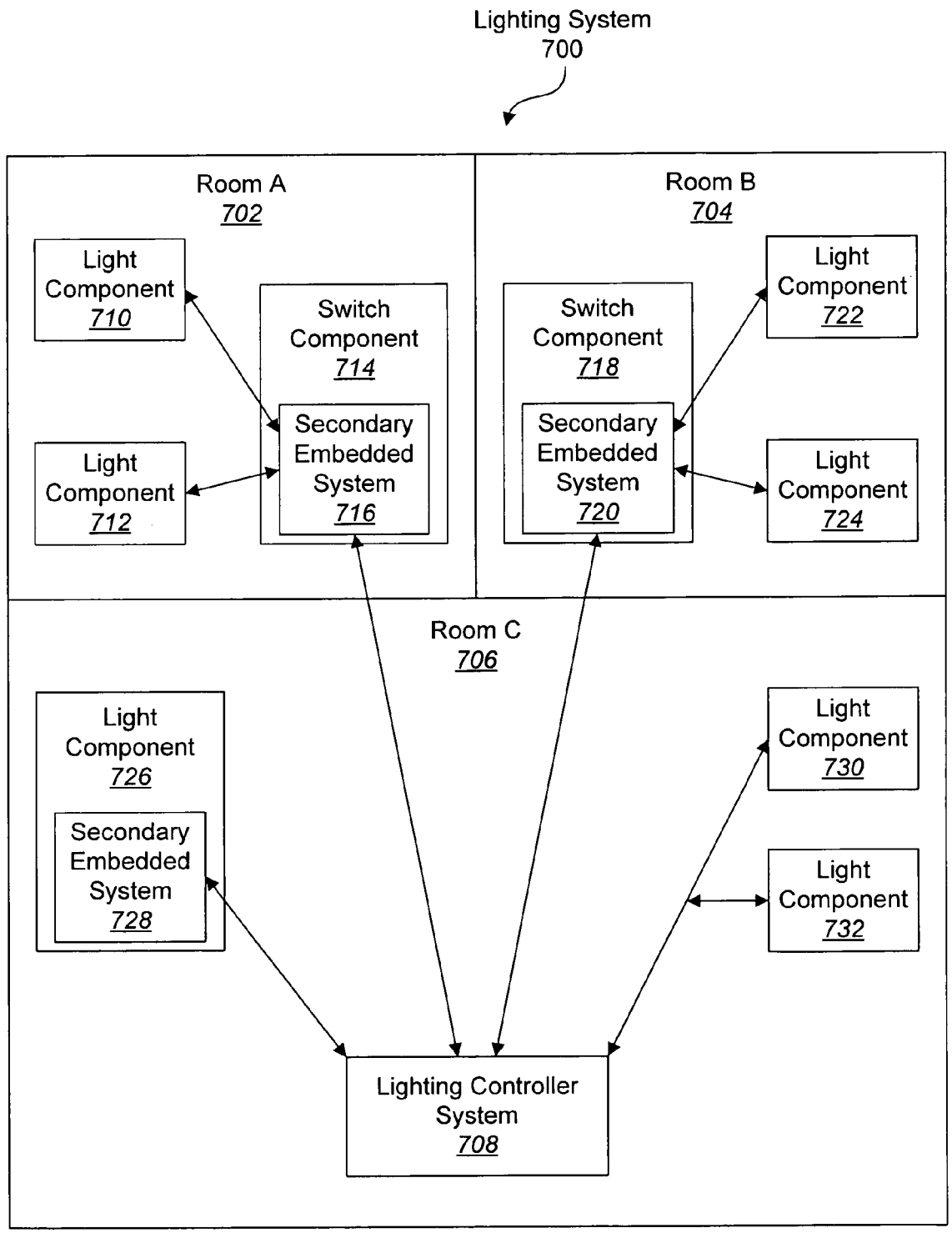
FIG. 7 illustrates an exemplary lighting system in which the present systems and methods may be implemented.

The present systems and methods may be used in several contexts. FIG. 7 illustrates one embodiment of a system wherein the present systems and methods may be implemented. FIG. 7 is a block diagram that illustrates one embodiment of a lighting system 700 that includes a lighting controller system 708. The lighting system 700 of FIG. 7 may be incorporated in various rooms in a home. As illustrated, the system 700 includes a room A 702, a room B 704, and a room C 706. Although three rooms are shown in FIG. 7, the system 700 may be implemented in any number and variety of rooms within a home, dwelling, or other environment.

The lighting controller system 708 may monitor and control additional embedded systems and components within the system 700. In one embodiment, the room A 702 and the room B 704 each include a switch component 714, 718. The switch components 714, 718 may also include a secondary embedded system 716, 720. The secondary embedded systems 716, 720 may receive instructions from the lighting controller system 708. The secondary embedded systems 716, 720 may then execute these instructions. The instructions may include powering on or powering off various light components 710, 712, 722, and 724. The instructions may also include dimming the brightness or increasing the brightness of the various light components 710, 712, 722, and 724. The instructions may further include arranging the brightness of the light components 710, 712, 722, and 724 in various patterns. The secondary embedded systems 716, 720 facilitate the lighting controller system 708 to monitor and control each light component 710, 712, 722, and 724 located in the room A 702 and the room B 704.

The lighting controller system 708 might also provide instructions directly to a light component 726 that includes a secondary embedded system 728 in the depicted room C 706. The lighting controller system 708 may instruct the secondary embedded system 728 to power down or power up the individual light component 726. Similarly, the instructions received from the lighting controller system 708 may include dimming the brightness or increasing the brightness of the individual light component 726.

The lighting controller system 708 may also monitor and provide instructions directly to individual light components 730 and 732 within the system 700. These instructions may include similar instructions as described previously.

Figure 8:
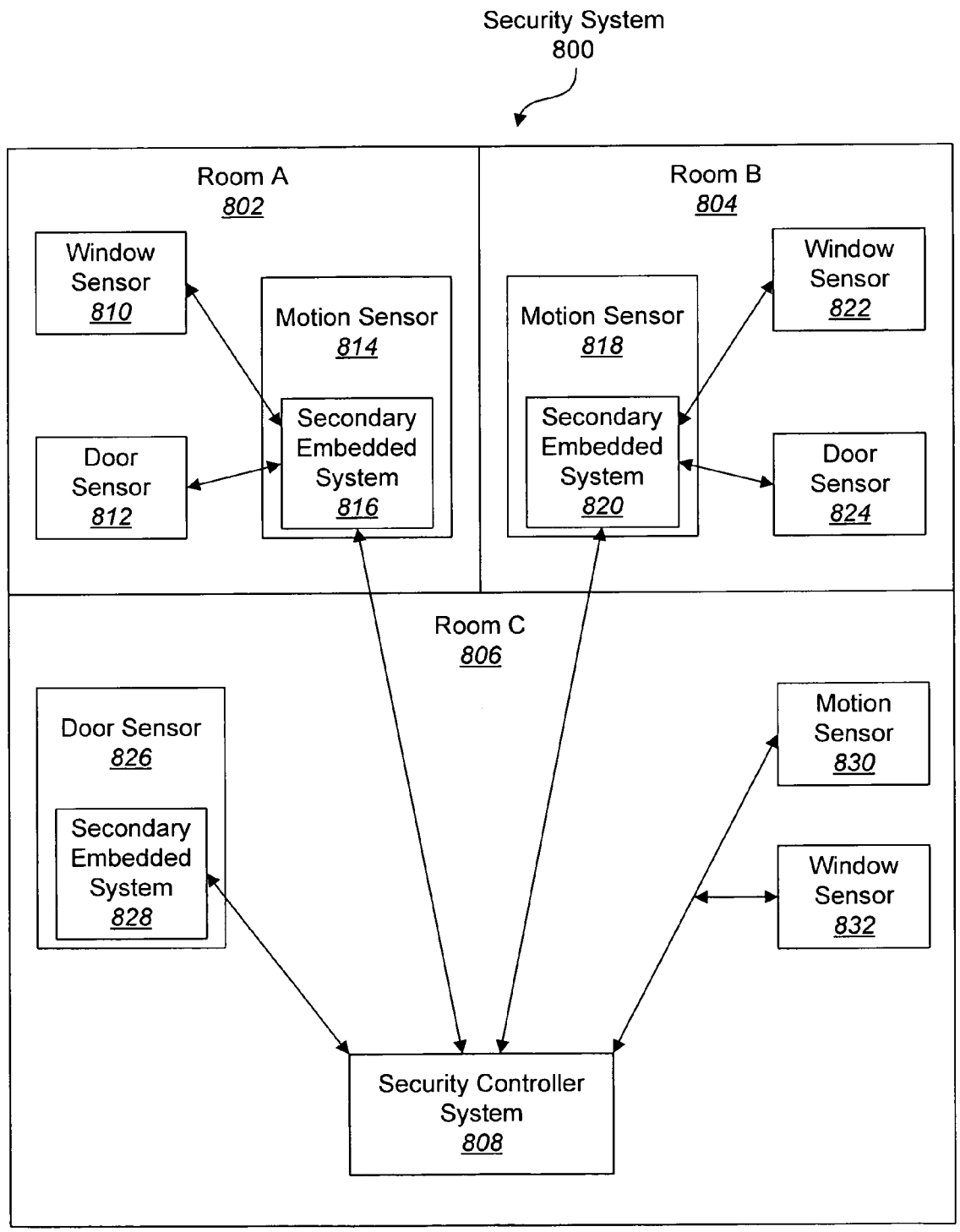
FIG. 8 illustrates an exemplary security system in which the present systems and methods may be implemented.

FIG. 8 is an additional embodiment of a system wherein the present systems and methods of the present invention may be implemented. FIG. 8 is a block diagram illustrating a security system 800. The security system 800 in the depicted embodiment is implemented in a room A 802, a room B 804, and a room C 806. These rooms may be in the confines of a home or other enclosed environment. The system 800 may also be implemented in an open environment where the rooms A, B and C, 802, 804, and 806 respectively represent territories or boundaries.

The system 800 includes a security controller system 808. The security controller system 808 monitors and receives information from the various components within the system 800. For example, a motion sensor 814, 818 may include a secondary embedded system 816. The motion sensors 814, 818 may monitor an immediate space for motion and alert the security controller system 808 when motion is detected via the secondary embedded system 816, 820. The security controller system 808 may also provide instructions to the various components within the system 800. For example, the security controller system 808 may provide instructions to the secondary embedded systems 816, 820 to power up or power down a window sensor 810, 822 and a door sensor 812, 824. In one embodiment, the secondary embedded systems 816, 820 notify the security controller system 808 when the window sensors 810, 822 detect movement of a window. Similarly, the secondary embedded systems 816, 820 notify the security controller system 808 when the door sensors 812, 824 detect movement of a door. The secondary embedded systems 816, 820 may instruct the motion sensors 814, 818 to activate the LED (not shown) located within the motion sensors 814, 818.

The security controller system 808 may also monitor and provide instructions directly to individual components within the system 800. For example, the security controller system 808 may monitor and provide instructions to power up or power down to a motion sensor 830 or a window sensor 832. The security controller system 808 may also instruct the motion sensor 830 and the window sensor 832 to activate the LED (not shown) or audio alert notifications within the sensors 830 and 832.

Each individual component comprising the system 800 may also include a secondary embedded system. For example, FIG. 8 illustrates a door sensor 826 including a secondary embedded system 828. The security controller system 808 may monitor and provide instructions to the secondary embedded system 828 in a similar manner as previously described.

Figure 9:
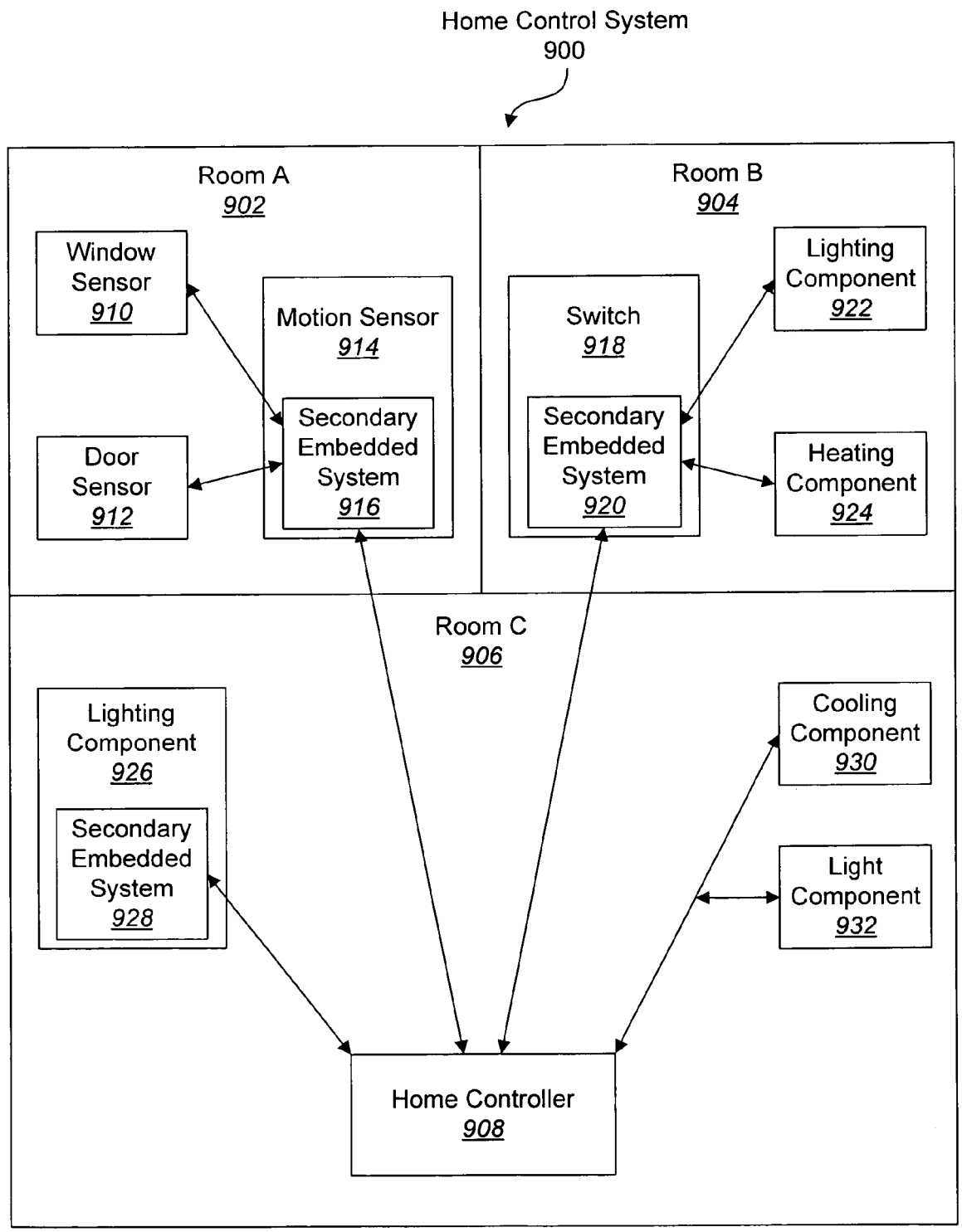
FIG. 9 illustrates an exemplary home controller system in which the present systems and methods may be implemented.

FIG. 9 is a block diagram illustrating one embodiment of a home control system 900. The home control system 900 includes a home controller 908 that facilitates the monitoring of various systems such as the lighting system 700, the security system 800, and the like. The home control system 900 allows a user to control various components and systems through one or more embedded systems. In one embodiment, the home controller system 908 monitors and provides information in the same manner as previously described in relation to FIGS. 7 and 8. In the depicted embodiment, the home controller 908 provides instructions to a heating component 924 via a secondary embedded system 920. The heating component 924 may include a furnace or other heating device typically found in resident locations or offices. The home controller system 908 may provide instructions to power up or power down the heating component 924 via the secondary embedded system 920.

Similarly, the home controller 908 may monitor and provide instructions directly to a component within the home control system 900 such as a cooling component 930. The cooling component 930 may include an air conditioner or other cooling device typically found in resident locations or offices. The central home controller 908 may instruct the cooling component 930 to power up or power down depending on the temperature reading collected by the central embedded system 908. The home control system 900 functions in a similar manner as previously described in relation to FIGS. 7 and 8.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for processing multicast requests on a computer network, comprising:
    receiving, at a proxy server, registration of a plurality of non-multicast nodes that do not process multicast messages, wherein at least one non-multicast node is a multicast node configured to or notified not to process multicast messages;
    receiving, at the proxy server, a request for a service from a requestor via multicast;
    identifying, at the proxy server, among the plurality of non-multicast nodes one or more providers of the requested service; and
    sending the request from the proxy server, not using multicast, to the one or more providers without sending the request to other non-multicast nodes on the computer network, wherein the proxy server sends the request, which was previously multicast, such that at least one of the one or more providers responds to the request although the one or more providers comprise non-multicast nodes that do not process multicast messages.

2. The method of claim 1, further comprising:
    receiving at least one response to the request from the one or more providers; and
    sending the at least one response to the requestor.

3. The method of claim 1, wherein the request is sent to the one or more providers via a connection-based protocol.

4. The method of claim 1, wherein the request is sent to the one or more providers via a connectionless protocol.

5. The method of claim 1, wherein identifying the one or more providers comprises:
    detecting a service identifier within the request that identifies the requested service; and
    searching for the service identifier within a database of registered nodes.

6. The method of claim 1, further comprising identifying a plurality of potential providers with a same node identifier, and wherein identifying a provider comprises selecting the provider from among the plurality of potential providers with the same node identifier.

7. The method of claim 1, wherein receiving registration of the multicast node configured to or notified not to process multicast messages comprises periodically sending a proxy announcement message via multicast.

8. The method of claim 7, wherein sending the proxy announcement is performed by a selective proxy server connected to the multicast node configured to or notified not to process multicast messages, and wherein the receiving of the proxy announcement message by the multicast node configured to or notified not to process multicast messages results in the multicast node configured to or notified not to process multicast messages ceasing to process multicast requests as long as the multicast node configured to or notified not to process multicast messages remains connected to the selective proxy server.

9. The method of claim 1, wherein the plurality of non-multicast nodes comprises at least one resource constrained node that is not capable of processing multicast messages.

10. The method of claim 1, wherein the proxy server, the requestor, and the plurality of non-multicast nodes are all located within a same local area network.

11. A computer system that is configured for processing multicast requests on a computer network, the computer system comprising:
    a processor;
    memory in electronic communication with the processor;
    instructions stored in the memory, the instructions being executable to:
        receive, at a proxy server, registration of a plurality of non-multicast nodes that do not process multicast messages, wherein at least one non-multicast node is a multicast node configured to or notified not to process multicast messages;
        receive, at the proxy server, a request for a service from a requestor via multicast;
        identify, at the proxy server, among the plurality of non-multicast nodes one or more providers of the requested service; and
        send the request from the proxy server, not using multicast, to the one or more providers without sending the request to other non-multicast nodes on the computer network, wherein the proxy server sends the request, which was previously multicast, such that at least one of the one or more providers responds to the request although the one or more providers comprise non-multicast nodes that do not process multicast messages.

12. The computer system of claim 11, wherein the instructions are further executable to:
   receive at least one response to the request from the one or more providers; and
   send the at least one response to the requestor.

13. The computer system of claim 11, wherein the request is sent to the one or more providers via a connection-based protocol.

14. The computer system of claim 11, wherein the request is sent to the one or more providers via a connectionless protocol.

15. The computer system of claim 11, wherein the instructions executable to identify the one or more providers comprise instructions executable to:
   detect a service identifier within the request that identifies the requested service; and
   search for the service identifier within a database of registered nodes.

16. A non-transitory computer storage medium comprising executable instructions for processing multicast requests on a computer network, the instructions being executable to:
   receive, at a proxy server, registration of a plurality of non-multicast nodes that do not process multicast messages, wherein at least one non-multicast node is a multicast node configured to or notified not to process multicast messages;
   receive, at the proxy server, a request for a service from a requestor via multicast;
   identify, at the proxy server, among the plurality of non-multicast nodes one or more providers of the requested service; and
   send the request from the proxy server, not using multicast, to the one or more providers without sending the request to other non-multicast nodes on the computer network, wherein the proxy server sends the request, which was previously multicast, such that at least one of the one or more providers responds to the request although the one or more providers comprise non-multicast nodes that do not process multicast messages.

17. The non-transitory computer storage medium of claim 16, wherein the instructions are further executable to:
   receive at least one response to the request from the one or more providers; and
   send the at least one response to the requestor.

18. The non-transitory computer storage medium of claim 16, wherein the request is sent to the one or more providers via a connection-based protocol.

19. The non-transitory computer storage medium of claim 16, wherein the request is sent to the one or more providers via a connectionless protocol.

20. The non-transitory computer storage medium of claim 16, wherein the instructions executable to identify the one or more providers comprise instructions executable to:
   detect a service identifier within the request that identifies the requested service; and
   search for the service identifier within a database of registered nodes.

* * * * *

UNITED STATES PATENT AND TRADEMARK OFFICE
CERTIFICATE OF CORRECTION

PATENT NO. : 8,626,925 B2  
APPLICATION NO. : 11/305838  
DATED : January 7, 2014  
INVENTOR(S) : Thomas Milligan et al.

It is certified that error appears in the above-identified patent and that said Letters Patent is hereby corrected as shown below:

In the Specification

In column 2, line 67 please delete ""requester"" and replace it with --"requestor"--.

In column 3, line 12 please delete "a requester" and replace it with --a requestor--.

Signed and Sealed this  
Seventeenth Day of June, 2014

Michelle K. Lee  
*Deputy Director of the United States Patent and Trademark Office*